United States Patent [19]

Meijer et al.

[11] Patent Number: 4,836,094
[45] Date of Patent: Jun. 6, 1989

[54] YIELDABLY MOUNTED LUBRICANT CONTROL ASSEMBLIES FOR PISTON RODS

[75] Inventors: Roelf J. Meijer; Benjamin Ziph, both of Ann Arbor, Mich.

[73] Assignee: Stirling Thermal Motors, Inc., Ann Arbor, Mich.

[21] Appl. No.: 166,319

[22] Filed: Mar. 10, 1988

[51] Int. Cl.$^4$ ............................................. F16J 15/18
[52] U.S. Cl. .................................... 92/167; 92/168; 92/128; 277/116.2; 277/117
[58] Field of Search ................... 92/153, 165 R, 167, 92/168, 128; 277/112, 116.2, 117, 118, 119, 173, 174, 177, 212 FB, 190

[56] References Cited

U.S. PATENT DOCUMENTS

| 380,488 | 4/1888 | Jarvis | 92/167 |
| 2,836,252 | 5/1958 | Lane | 277/116.2 |
| 4,170,363 | 10/1979 | Bergman | 277/116 X |
| 4,411,435 | 10/1983 | McStravick | 277/117 X |
| 4,579,046 | 4/1986 | Meijer et al. | 92/167 |

FOREIGN PATENT DOCUMENTS

| 251406 | 11/1911 | Fed. Rep. of Germany | 277/117 |
| 3653 | 1/1979 | Japan | 277/177 |

Primary Examiner—Robert E. Garrett
Assistant Examiner—Mark A. Williamson
Attorney, Agent, or Firm—Harness, Dickey & Pierce

[57] ABSTRACT

Improved lubricant control assemblies are disclosed for reciprocating piston rods of an engine which prevent crankcase lubricant intruding into the cylinders and fluid from the cylinders from escaping into the crankcase. Each assembly comprises a tubular sleeve fitting closely onto a piston rod and yieldably mounted within the bore between cylinder and crankcase through which the piston rod extends. The sleeve is urged into forceful contact around the piston rod by a plurality of disk members which forcefully urge the sleeve in contact around the piston and for controlling lubrication.

15 Claims, 3 Drawing Sheets

YIELDABLY MOUNTED LUBRICANT CONTROL ASSEMBLIES FOR PISTON RODS

BACKGROUND AND SUMMARY OF THE INVENTION

This invention relates generally to thermal engines and is particularly concerned with an improved lubricant control assembly for a piston rod of such an engine.

In certain types of engine designs, it is necessary to provide a lubricant control assembly around a reciprocating piston rod. For example, in an engine having a pressurized crankcase, such an assembly serves a purpose of preventing oil from the crankcase penetrating into the thermodynamic cycles occurring in the cylinder within which the piston, which is attached to the piston rod, reciprocates. Peneration of oil from the crankcase to the cylinder can, in turn, be conveyed to other components giving rise to deteriorating performance and/or permanent damage.

Various types of lubricant control assemblies have heretofore been proposed. A known of lubricant control assembly is positioned on the engine housing and comprises a scraper which may take the form of a tube fitting closely onto a piston rod. Additional components are associated with the scraper to cause it to forcefully engage the piston rod and such a component may comprise a clamping ring. For example, the clamping ring may be of a circular shape fitting over one end of the tubular scraper to forcefully urge that end of the scraper against the piston rod. As the piston rod reciprocates, it passes back and forth through the scraper and the forceful engagement of one end of the scraper with the piston rod serves to prevent oil from passing from the crankcase into the cylinder.

Moreover, a particular arrangement may control the separation between the crankcase and the cylinder such that the scraper controls the pumping action of oil. For example, it may be desirable to enable oil to be pumped on the upstroke so as to provide a very thin film of oil for the piston rod. The scraper may act much in the manner of a check valve on the downstroke preventing any reverse flow of fluid from the cylinder into the crankcase.

Depending upon the nature of any particular construction of such an engine, a piston rod may be subjected to forces which comprise not only axial, but also radial, components. For example, in an engine in which a swashplate is journaled for rotation on a housing and the swashplate is driven by crossheads connected to axially reciprocating pistons and piston rods, the force acting on a piston rod may be resolved into an axial component and a radial component.

The present invention arises in part through the recognition that radial forces imparted to such a piston rod have a significant influence on the effectiveness of a piston rod lubricant control assembly. In other words, if there are significant radial forces acting on a piston rod, there is a greater potential for undesired leakage of oil from the crankcase into the cylinder and loss of fluid from the cylinder to the crankcase. In other types of engines, it also is possible that reciprocating piston rods may experience radial force components which can have similar adverse effects on the lubricant control assemblies.

Another type of lubricant is illustrated in U.S. Pat. No. 4,579,046, entitled Yieldably Mounted Lubricant Control Assemblies For Piston Rods, issued Apr. 1, 1986 to Meijer et al. and assigned to the same assignee as the present invention, the specification of which is herein incorporated by reference. While this lubricant control assembly works satisfactorily, the present invention is an improvement from the standpoint of assembly, adjustability, simplicity and cost.

One important advantage of the present invention is that it allows a certain limited amount of radial movement of the piston rod without significantly detracting from the effectiveness of the control action. Hence, the presence of such radial forces can be better tolerated.

From the subsequent description and the appended claims taken in conjunction with the accompanying drawings, additional objects and advantages of the present invention will become apparent to those skilled in the art.

DESCRIPTION OF THE PREFERRED EMBODIMENT

Figure 1:
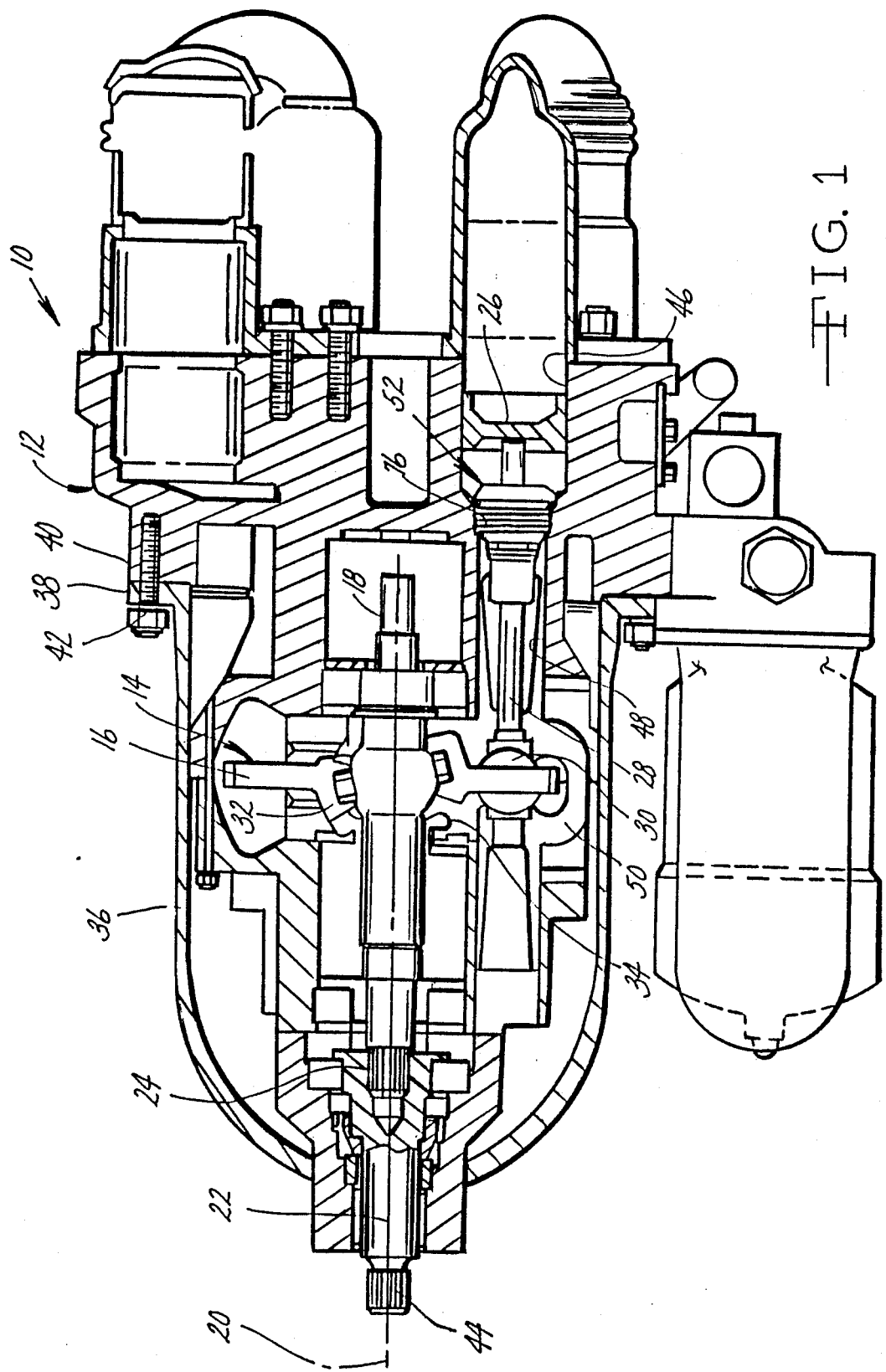
FIG. 1 is a longitudinal view, mostly in cross section, through an example of a heat engine containing an improved piston rod lubrication control assembly according to principles of the present invention.

FIG. 1 illustrates a representative thermal engine 10 containing lubricant control assemblies embodying principles of the present invention. Before describing details of the lubricant control assemblies, a general discussion of the engine construction is in order.

Engine 10 comprises a housing designated by the general reference numeral 12 and which in the engine illustrated has multiple parts assembled together.

Housing 12 contains an operating mechanism, designated by the general reference numeral 14, for converting the reciprocating motion of pistons into rotation of a drive shaft. The pistons are caused to reciprocate by working fluid conveyed to and from the cylinders within which the pistons are disposed.

The mechanism 14 includes a swashplate 16 on a shaft 18 journaled on housing 12 for rotation about an axis 20. Shaft 18 forms a first part of the engine drive shaft and there is also a second part 22 of the drive shaft which is operatively coupled with shaft 18 by a spline connection 24.

Energy is imparted to swashplate 16 by pistons 26 having piston rods 28 which act upon the swashplate 16 at locations spaced radially outwardly of axis 20, for example, at the locations where sliders 30 are positioned in FIG. 1. The swashplate 16 is mounted on shaft 18 so as to rotate about axis 20. Crossheads which slidably connect piston rods 28 to swashplate 16 are equipped with sliders 30 which cause reciprocation of the pistons to rotate swashplate 16 and thus shaft 18.

Gears 32 and 34 are part of a mechanism which effects relative rotation between swashplate 16 and shaft 18 so as to change the angle of the swashplate 16, thereby changing the piston stroke and hence the engine power.

The illustrated engine further comprises a pressure hull 36 which has a cooperative association with housing 12. As can be seen in FIG. 1, pressure hull 36 is fitted over one axial end of the engine and includes a distal flange 38 which is disposed against and attached and sealed to a mating flange 40 of housing 12 with removable fasteners 42 used for the attachment.

The cooperative association of pressure hull 36 with housing 12 defines an interior space which is subjected to pressures different than those which may exist on the exterior of the engine. Hence, there are provided suitable seals (unnumbered) between the various parts where the drive shaft extends through the hemispherical-shaped left-hand end of the pressure hull as viewed in FIG. 1. The drive shaft parts are journaled on the engine housing by suitable bearing assemblies (also unnumbered). The drive shaft is provided with an external spline 44 for connecting the drive shaft to any utilization device (not shown) which is to be powered by the engine.

The engine has a number of pistons and piston rods acting on the swashplate. FIG. 1 shows one of them. The cylinder within which piston 26 reciprocates is identified by the reference numeral 46. A bore 48 is provided in housing 12 extending from the left-hand end of cylinder 46, as viewed in FIG. 1, to a crankcase area 50.

A lubricant control assembly 52 is mounted on housing 12 and bore 48 for cooperative association with piston rod 28. The lubricant control assembly functions to enable the piston rod 28 to reciprocate axially while it also serves to separate cylinder 46 from crankcase 50 for the principal purposes of preventing lubricant from passing from the crankcase 50 through bore 48 and into cylinder 46 and of preventing leakage of fluid in cylinder 26 through bore 48 to crankcase 50.

Figure 2:
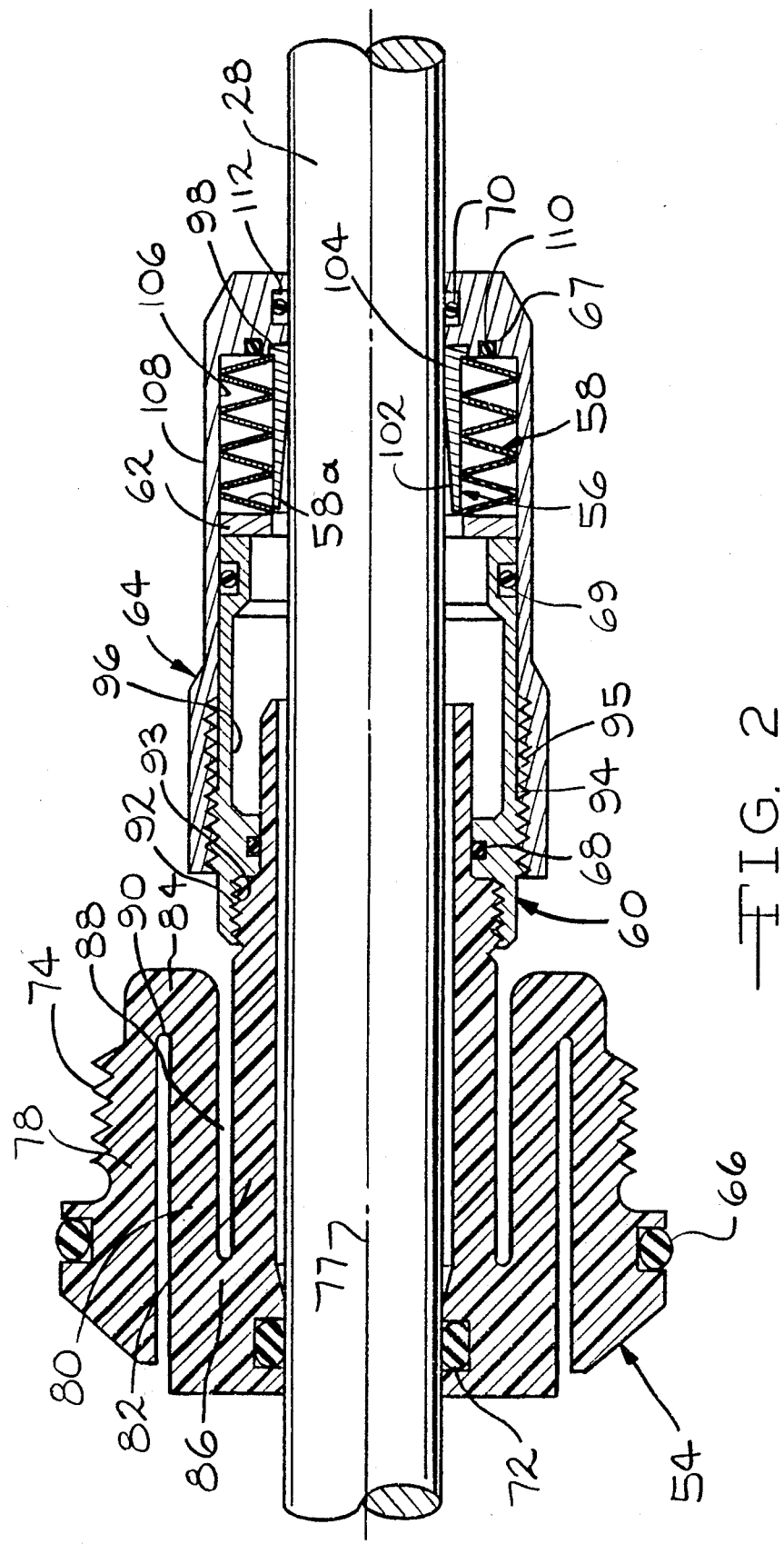
FIG. 2 is an enlarged longitudinal view mostly in cross section through the improved piston rod lubrication control assembly shown in FIG. 1.

Details of lubricant control assembly 52 are illustrated with reference to FIGS. 2, 3 and 4.

The preferred embodiment of lubricant control assembly comprises a plurality of component assembled together including a complaint housing 54, a sleeve scraper 56 and a plurality of non-planar disk members 58. Additional structural parts include an inner sleeve 60 extending from the complaint housing 54 to sleeve scraper 56, a ring member 62 between the inner sleeve 60 and sleeve scraper 56, and an outer housing 64 which is adjustably coupled with the inner sleeve 60 covering the disk members 58, sleeve scraper 56, ring 62 and a portion on the inner sleeve 60. The assembly also includes O-ring seals 66, 67, 68, 69 and 70 as indicated. The preferred construction includes a cap seal 72 acting between the compliant housing 54 and piston rod 28.

As can be appreciated, the various parts of the lubricant control 52 have central through-apertures providing for the passage of piston rod 28 through the assembly.

Lubricant control assembly 52 mounts on housing 12 within bore 48 by means of compliant housing 54. For this purpose compliant housing 54 is provided with a circumferential screw thread 74. This screw thread 74 provides for the lubricant control assembly to be threaded into complementary screw thread portion 76 of bore 48. The O-ring seal 66 is provided to assist in a leak-proof seal around the full circumference of compliant housing 54 with respect to bore 48.

Compliant housing 54 is so constructed that when it is threaded into bore 48, it can assume shapes with which are slightly different from its free shape, the free being substantially uniform about the main central axis 77 of the assembly which ideally is coaxial with the piston rod. In the illustrated embodiment of compliant housing 54, this attribute of compliance is achieved by the particular shape of the compliant housing and the material which is used to make it.

The illustrated construction for compliant housing 54 comprises a suitable plastic such as nylon, for example. The nylon part has a shaped which may be considered as a succession of three axially extending concentric ring portions of different diameters. The reference numeral 78 designates the largest diameter ring portion, the reference numeral 80 the next largest, and the reference numeral 82 the smallest. As can be appreciated from consideration of the drawing figure, it is outer ring portion 78 which contains threads 74 for screwing into bore 48, and it is inner ring portion 82 which is disposed closely around piston rod 28. Thus, the ring portion 80 constitutes an intermediate ring lying radially between the outer and inner ring portions 78 and 82.

One end of the intermediate ring portion 80 integrally joins with a corresponding axial end of outer ring portion 78 and the opposite axial end of intermediate ring portion 80 joins with a corresponding axial end of inner ring portion 82. Thus, in the illustrated embodiment, a radially extending joining portion 84 is seen to join rings 78 and 80 and a radially extending joining portion 86 is seen to join rings 80 and 82. With this arrangement, the respective joinings of the intermediate ring portion to its immediate outer ring portion and to its inner ring portion take place at alternate axial ends.

Because the compliant housing is made from a material such as nylon, it can be machined, molded, or otherwise manufactured as a unitary part. This construction of compliant housing 54 defines two circular slots extending axially into the compliant housing from opposite axial sides at different radii. These slots are identified by the reference numerals 88 and 90 with the latter being the slot of smaller radius.

Inner ring portion 82 extends axially away from the compliant housing beyond the joining portion 84 such that portion 82 has a free distal end extending into the interior of the inner sleeve 60. This end is threaded at 92 so as to enable an axial end of inner sleeve 60 to be threaded onto the compliant housing by means of a thread 93 on inner sleeve 60. The O-ring seal 68 serves to seal between the two.

The inner sleeve 60 includes threads 94 on its exterior surface for adjustably coupling the outer housing 64 by threads 95. The inner sleeve 60 includes an interior cavity 96 positioned about the piston rod 28. The inner sleeve 60 at its other axial end abuts ring member 62 to provide an abutment surface between the inner member 60 and ring 62 to enable the ring 62 to be forced against disk members 58. The inner sleeve 60 is sealed against the outer housing 64 by O-ring 69.

The sleeve scraper 56 is a tubular member having a flange 98 at one of its axial ends. The flange 98 seats in a recess 100 in the outer housing 64 to enable sleeve scraper 56 to be forcefully urged against the piston rod 28 by the disk member 58. The sleeve scraper 56 has an inner surface 102 that angles away from the lubricant control portion 104 of the sleeve scraper 56 which is in intimate contact with the piston rod 28 when the outer housing 64 is in a loaded position as shown in FIG. 4.

The outer housing 64 includes a cavity 106 which houses the disk members 58, the sleeve scraper 56, the ring 62 and a portion of the inner sleeve 60. The inner cavity 106 has a wall 108 which the disk members 58 act upon as will be explained herein. Also, the outer housing 64 includes recesses 110, 112 including O-rings 67 and 70 which seals the outer housing against the piston rod 28.

Figure 3:
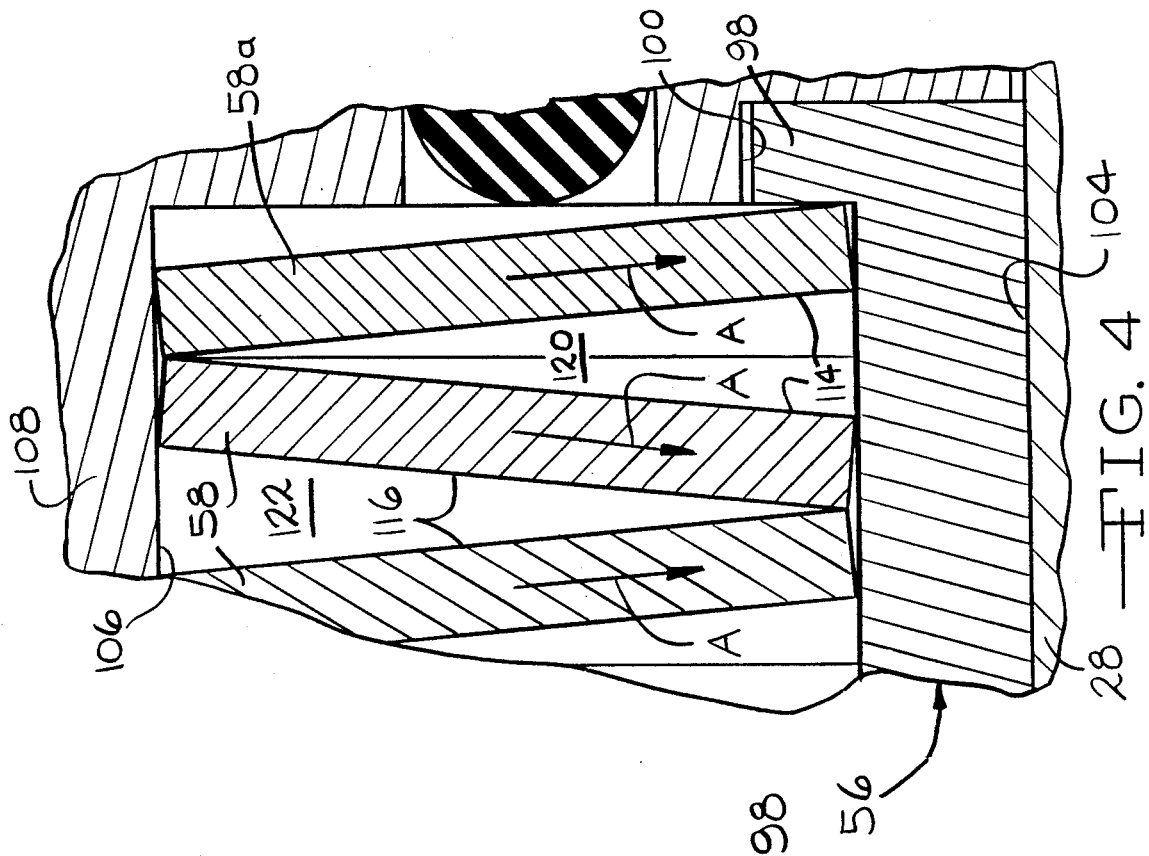
FIG. 3 is an enlarged detail cross-sectional view of a portion of the assembly shown in FIG. 2 showing the washers in a pre-loaded condition.
Figure 4:
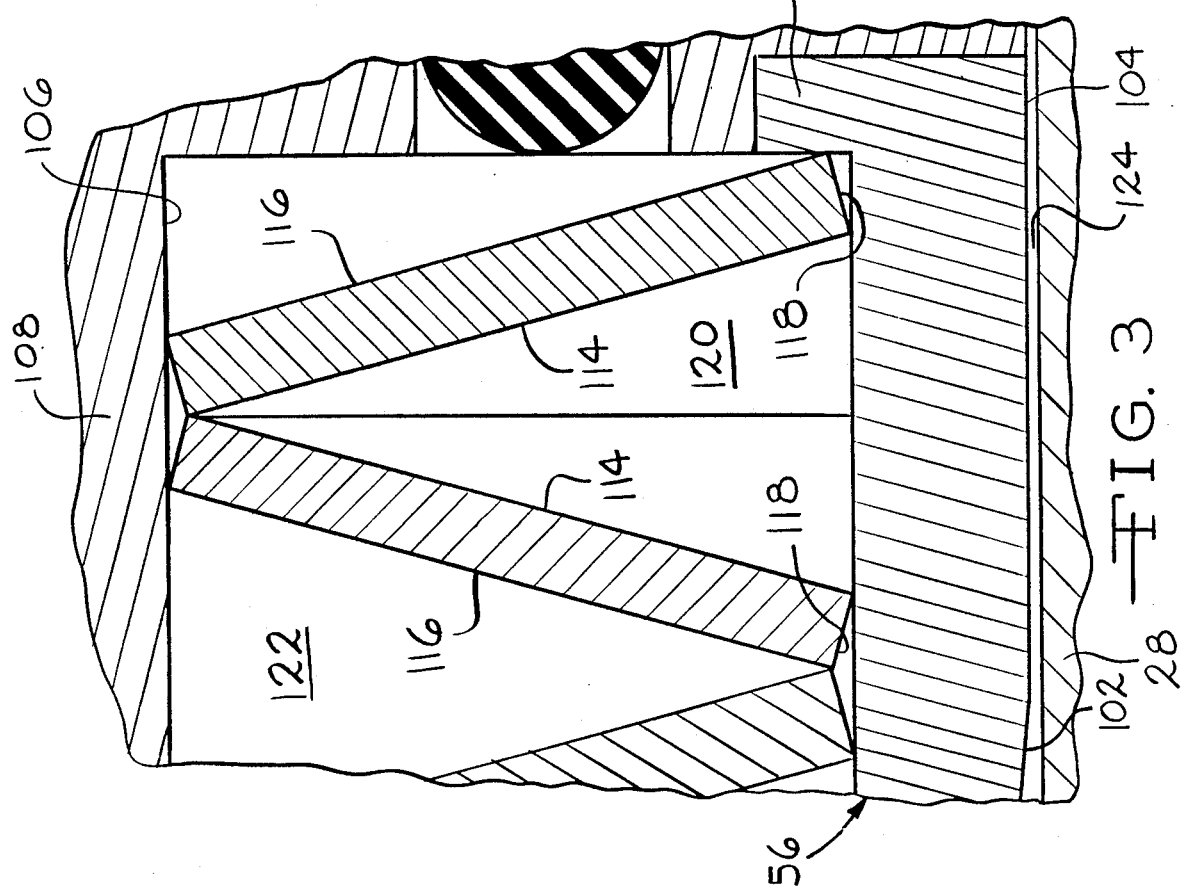
FIG. 4 is similar to FIG. 3 with the washers in a loaded condition.

Turning to FIGS. 3 and 4, a better understanding of the disk members 58 may be procured. The disk members 58, preferably Belleville washers, have concaved interior and exterior surfaces 114 and 116 with an axial aperture 118 surrounding and abutting the sleeve scraper 56. The Belleville washers or disk members 58 are positioned such that every other washer is inverted so that the concave interior surfaces 114 oppose one another creating interior gap 120 and exterior gaps 122 between adjacent washers, respectfully, as seen in FIGS. 3 and 4.

As the outer housing 64 is positioned onto the inner sleeve 60, the sleeve scraper 56 is positioned in the recess 100 and is out intimate contact with the piston rod 28 with a gap 124 between the sleeve scraper 56 and piston rod 28 as shown in FIG. 3. As the outer housing 64 is threadably tightened on the inner housing 60, the disk members 58 exert a radially inward force, as shown by arrows A, onto sleeve scraper 56, forcing the sleeve scraper 56 against the piston rod 28 at the lubricant control portion 104 as seen in FIG. 4. The disk members 58 act on the wall 108 to force the sleeve scraper 56 against the piston rod 28. However, the angular interior surface 102 of the sleeve scraper 56 prevents the remaining disk members 58 from forcing the sleeve scraper 56 against the piston rod 28 at the angular interior surface 102, and thus only enabling the lubricant control portion 104 of the sleeve scraper 56 to contact the piston rod 28 to enable lubrication of the piston rod 28. As the outer sleeve 64 is advanced on the inner sleeve 60, the axial force on the stack of washers 58 is increased tending to flatten the washers so that they apply a radially inward force of increasing magnitude to the scraper portion 104. Thus, the abiltiy of the scraper 56 to control lubricant is adjustable.

The end disk members 58a are positioned such that one acts on the ring 62 and the other on the flange 98 of the sleeve scraper 56. Thus, the disk members 58 also axially urge the sleeve scraper 56 axially along the piston rod 28.

Because of the interaction of the crosshead with sliders 30, the piston rod will be subjected to forces which bear not only axial components, but radial ones as well. The radial forces applied to the piston rod will tend to cause the piston rod to reciprocate not only with an axial component of motion but with slight radial components of displacement as well. In other words, they may tend to bend the piston rod slightly.

The lubricant control assembly according to the present invention performs admirably despite limited components of radial motion being imparted to the piston rod as it axially reciprocates. This attribute is provided by compliant housing 54. In the illustrated embodiment, it can be appreciated that compliant housing 54 enables its inner ring portion 86 to follow slight radial displacements of the piston rod while the outer ring 78 remains securely mounted in bore 48 on the housing. In other words, it may be considered that the slots 88 and 90 provide for the shape of the compliant housing to vary slightly so the inner ring portion 82 can follow slight radial displacement of the reciprocating piston rod to maintain scraper 56 coaxial with the piston rod. Because of compliant housing 54, the components of the lubricant control assembly which are attached to the lefthand end of the compliant housing's inner ring portion can follow small radial displacements of the piston rod, thereby maintaining substantially full effectiveness of the action of scraper 56 on piston rod 28.

Fabrication and assembly of the component parts of the lubricant control assembly are accomplished with conventional fabrication and assembly procedures. It will be appreciated that the various components at the left-hand end are assembled together and onto the left-hand end of the compliant housing such that a unitary assembly results. The unitary assembly is then threaded into the bore, for example, from the right-hand ends as viewed in FIG. 1 before the piston is assembled. In this regard, the right-hand axial face of the compliant housing may be provided with a suitable wrenching surface for engagement by a suitable tool for installing and/or removing the lubricant control assembly.

Alternate constructions for compliant housing 54 are also contemplated. These alternate constructions may differ from that illustrated in shape and/or material. For instance, the assembly may comprise a series of concentric tubes, aluminum for example, of varying diameters with an innermost tube and an outermost tube. There may be one or more intermediate tubes with the tubes being joined together at alternate axial ends in the manner which has been described for the illustrated nylon construction of compliant housing 54. The important function, regardless of construction, is to allow the other parts which are attached to the compliant housing to follow radial displacements of the reciprocating piston rod so that at all times the disk members are fully effective in maintaining forceful engagement of the sleeve scraper with the piston rod. The compliant housing is unlike a rolling diaphragm in that the compliant housing is essentially incapable of axial displacement.

The illustrated construction is effective to allow an ultra-thin flim of lubricant from the crankcase to pass through the sleeve scraper, but this will not cause serious consequences and may in fact be desirable. The entire lubricant control assembly is of course fully effective in maintaining separation of the crankcase from the cylinder.

While the above discloses the preferred embodiment of the present invention, it will be understood that modifications, variations, and alterations may be made to the present invention without varying from the scope and fair meaning of the subjoined claims.

What is claimed is:

1. In an engine having a housing comprising a cylinder within which a piston reciprocates and a piston rod extending from the piston through a bore which extends in said housing from said cylinder to a crankcase and a lubricant control assembly which is disposed within said bore in cooperative arrangement with said piston rod and functions to separate the cylinder from the crankcase while allowing the piston rod to reciprocate axially through a lubricant control portion of the lubricant control assembly which is in forceful contact around the piston rod, the improvement which comprises annular disk means having an axial aperture positioned peripherally about said lubricant control portion, said disk means being operable in response to an axial force to axially compress causing said aperture to radially contract and forcefully urge the lubricant control portion into forceful contact around the piston rod.

2. The improvement set forth in claim 1, wherein said disk means comprises a plurality of Belleville washers positioned peripherally about said lubricant control portion to forcefully urge the lubricant control portion into forceful contact around the piston rod.

3. The improvement set forth in claim 2, wherein said plurality of Belleville washers are positioned such that every other washer is inverted to form a plurality of gaps between said every other washer.

4. In an engine having a housing comprising a cylinder within which a piston reciprocates and a piston rod extending from the piston through a bore which extends in said housing from said cylinder to a crankcase and a lubricant control assembly which is disposed within said bore in cooperative arrangement with said piston rod and functions to separate the cylinder from the crankcase while allowing the piston rod to reciprocate axially through a lubricant control portion of the lubricant control assembly which is in forceful contact around the piston rod, the improvement which comprises a sleeve including said lubricant control portion positioned peripherally about said piston rod, and a stack of disk members having axial apertures positioned about the periphery of said sleeve, said disk members being operable in response to an axial force to axially compress causing said aperture to radially contract and forcefully urge the lubricant control portion of the sleeve into forceful contact around the piston rod, and means for adjusting the magnitude of the axial force which contracts said disk members.

5. The improvement set forth in claim 4, wherein said sleeve has an inner surface periphery around said piston rod, said inner surface angling away from said piston rod from said lubricant control portion which is in forceful contact with said piston rod.

6. The improvement set forth in claim 5, wherein said disk members comprise a plurality of Belleville washers positioned peripherally about said lubricant control portion to forcefully urge the lubricant control portion into forceful contact around the piston rod.

7. The improvement set forth in claim 6, wherein said plurality of Belleville washers are positioned such that every other washer is inverted to form a plurality of gaps between said every other washer.

8. In an engine having a housing comprising a cylinder within which a piston reciprocates and a piston rod extending from the piston through a bore which extends in said housing from the cylinder to a crankcase and a lubricant control assembly which is disposed within said bore in cooperative arrangement with said piston rod and functions to separate the cylinder from the crankcase while allowing the piston rod to reciprocate axially through a lubricant control portion of the lubricant control assembly which is in forceful contact around the piston rod, the improvement which comprises a compliant housing for mounting the lubricant control assembly on the engine housing, said compliant housing being operatively disposed between the engine housing and the lubricant control portion to allow the lubricant portion to be radially displaced with respect to said bore and thereby comply with radial displacement of the reciprocating piston rod while maintaining substantially full effectiveness of the lubricant control portion acting on the piston rod, said lubricant control assembly comprising an inner sleeve, means for attaching said inner sleeve to said compliant housing such that said inner sleeve can comply with radial displacement in the reciprocating piston rod, an outer housing frictionally attached to said inner sleeve, and disk means having an axial aperture positioned peripherally about said lubricant control portion and acting on an inner surface of said outer housing and said inner sleeve for urging said lubricant control portion into forceful contact around the reciprocating piston rod.

9. The improvement set forth in claim 8 further comprising a lubricant sleeve including said lubricant control portion positioned peripherally about said piston rod, said disk means urging said lubricant sleeve so that said lubricant control portion is in forceful contact around said piston rod.

10. The improvement set forth in claim 9, wherein said inner sleeve has an inner surface periphery around said piston rod, said inner surface angling away from said piston rod from said lubricant control portion which is in forceful contact with said piston rod.

11. The improvement set forth in claim 9 further comprising a ring member positioned peripherally about said piston rod and at an axial end of said inner sleeve and at an axial end of said lubricant sleeve such that said disk means acts on said ring member.

12. The improvement set forth in claim 9, wherein said outer housing includes a recess for receiving an axial end of said lubricating sleeve including said lubricating control portion.

13. The improvement set forth in claim 8, wherein said outer housing is threadably received on said inner sleeve enabling said outer housing to be adjusted on said inner sleeve which, in turn, adjusts the force exerted by said disk means onto said lubricant control portion.

14. The improvement set forth in claim 8, wherein said disk means is comprised of a plurality of Belleville washers.

15. The improvement set forth in claim 14, wherein said Belleville washers are positioned with respect to one another with every other washer being inverted such that gaps are formed between adjacent washers.

\* \* \* \* \*